No. 737,224. PATENTED AUG. 25, 1903.
T. J. GRAY.
GRADING AND DITCHING MACHINE.
APPLICATION FILED AUG. 3, 1901.
NO MODEL. 13 SHEETS—SHEET 4.
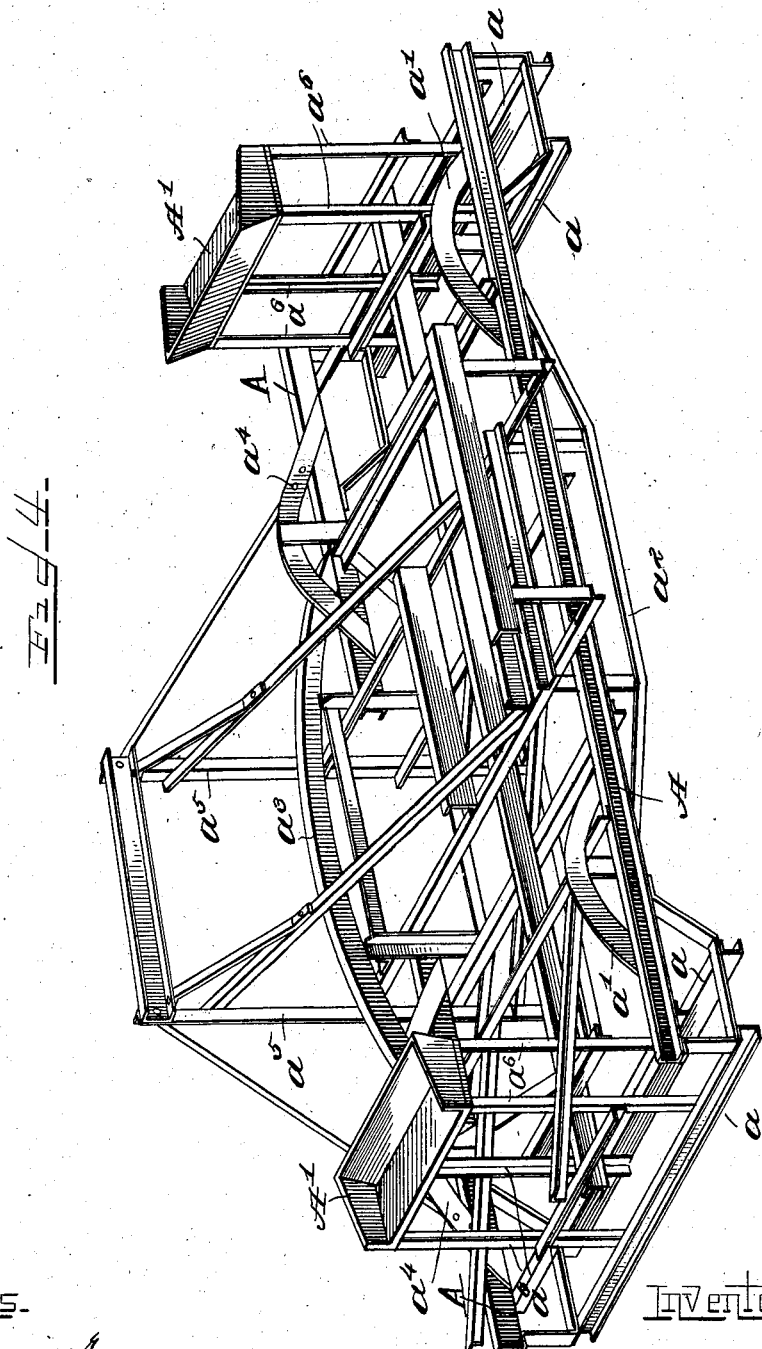
Witnesses
J. H. Glendening
A. F. Dmand
Inventor
Thomas J. Gray
by Chas. L. Page Atty

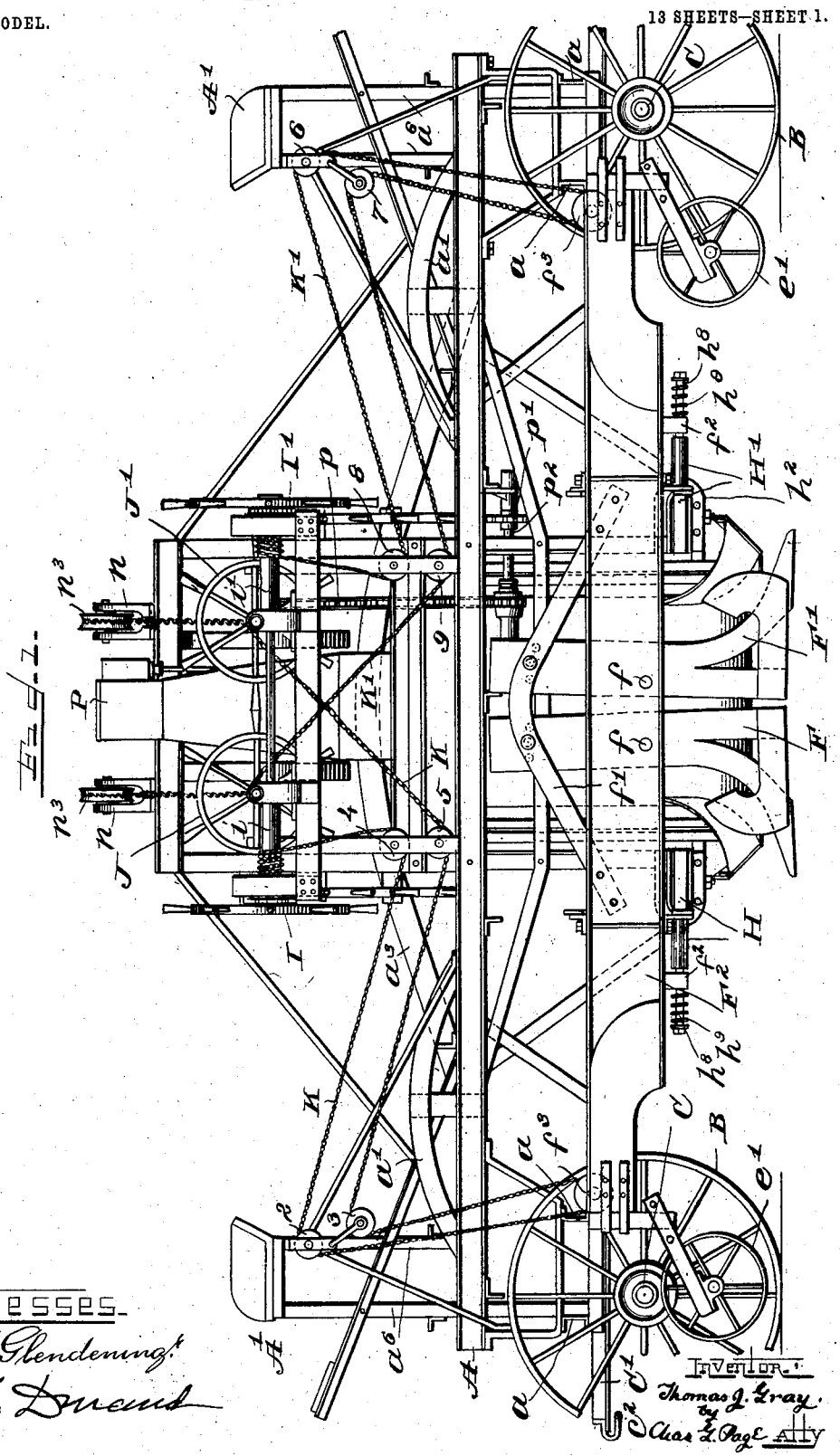

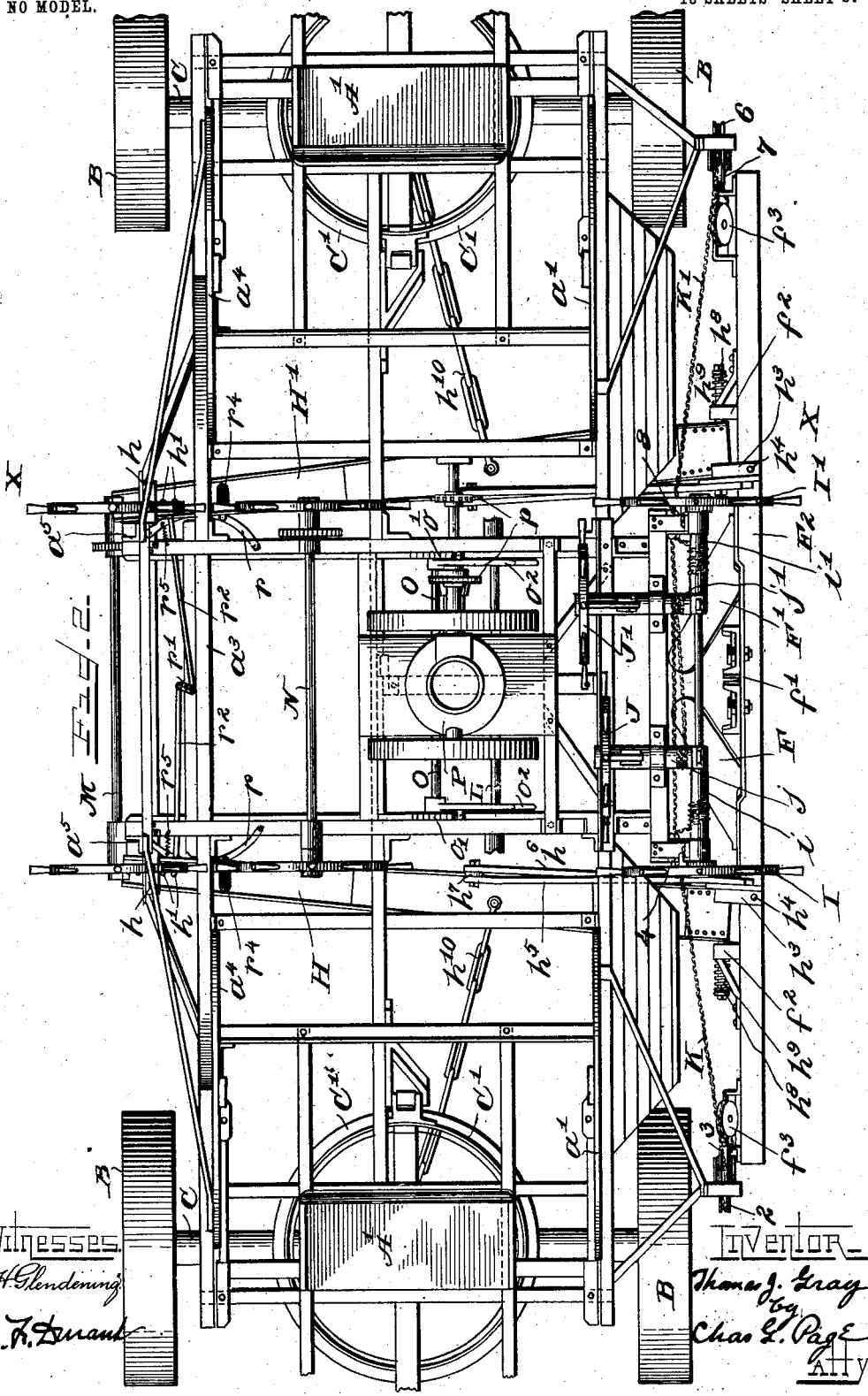

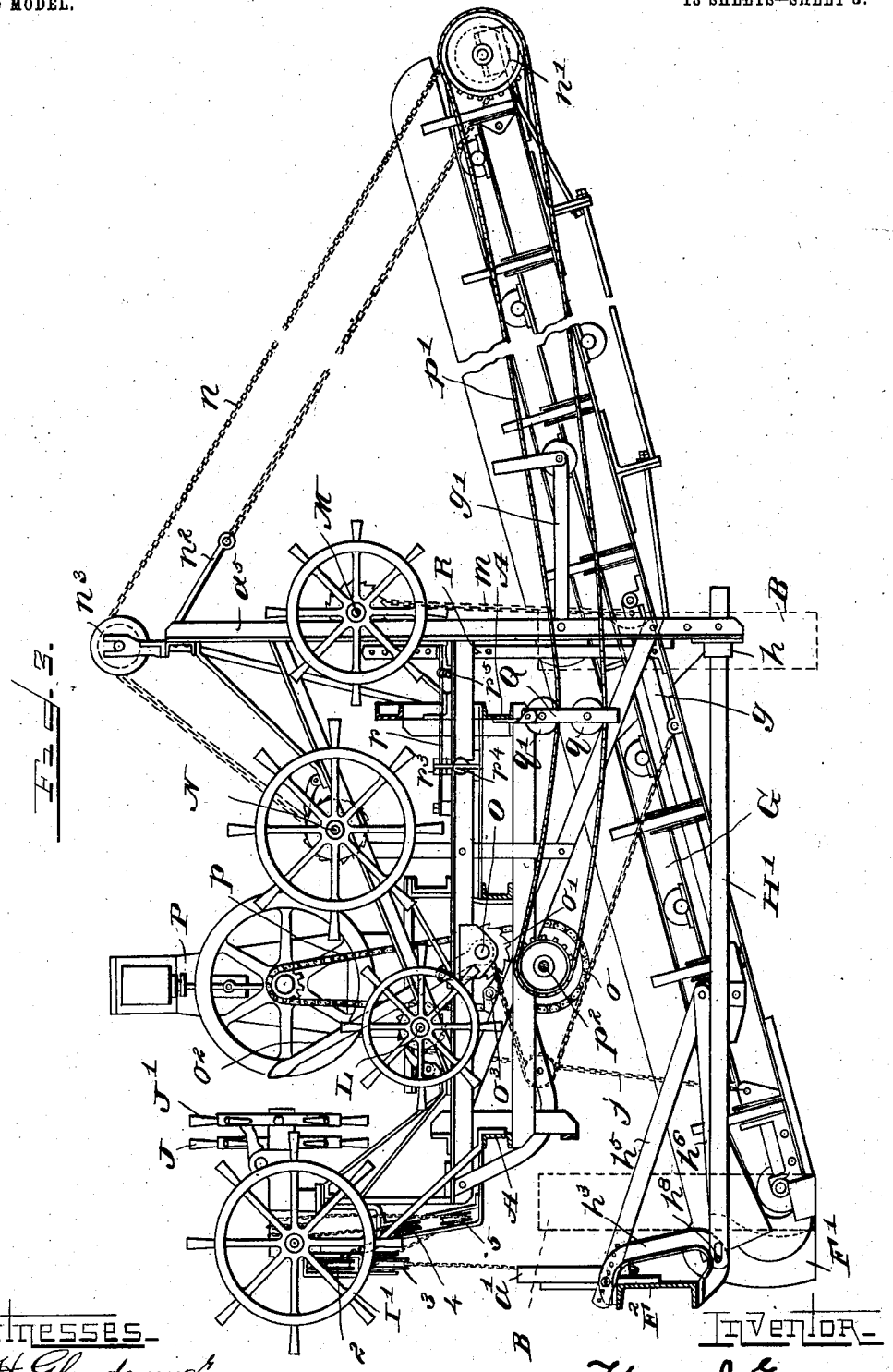

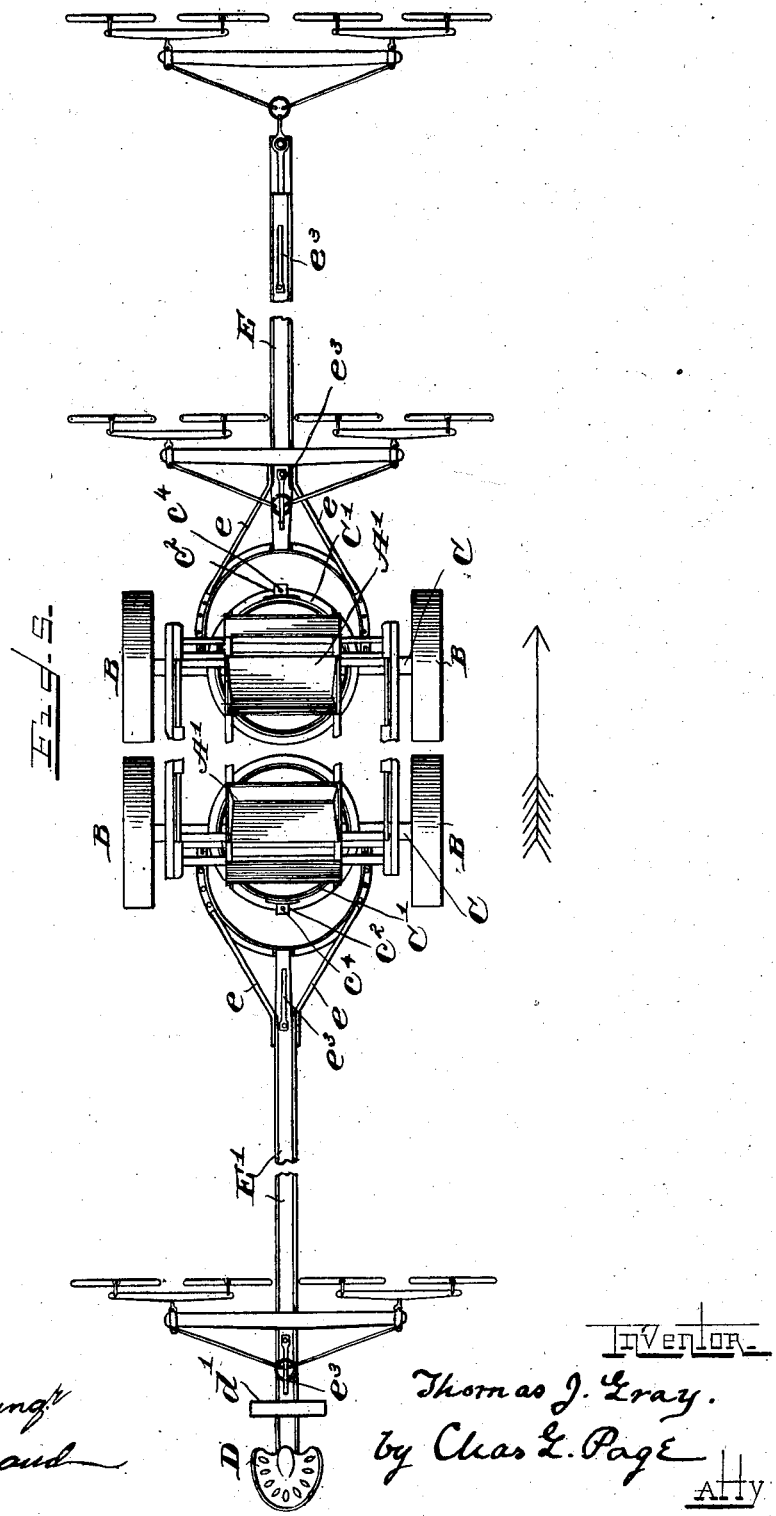

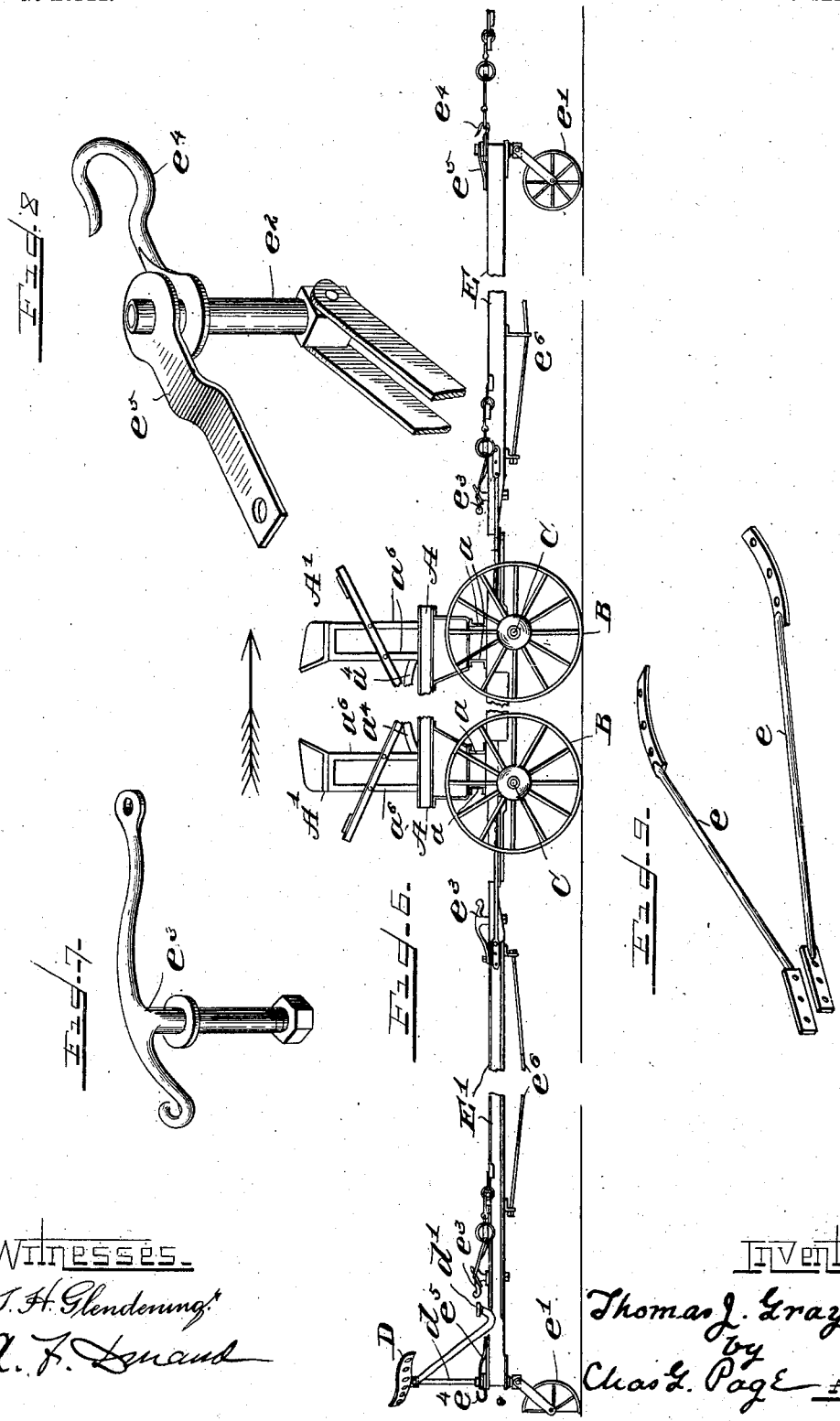

No. 737,224. PATENTED AUG. 25, 1903.
T. J. GRAY.
GRADING AND DITCHING MACHINE.
APPLICATION FILED AUG. 3, 1901.
NO MODEL. 13 SHEETS—SHEET 7.
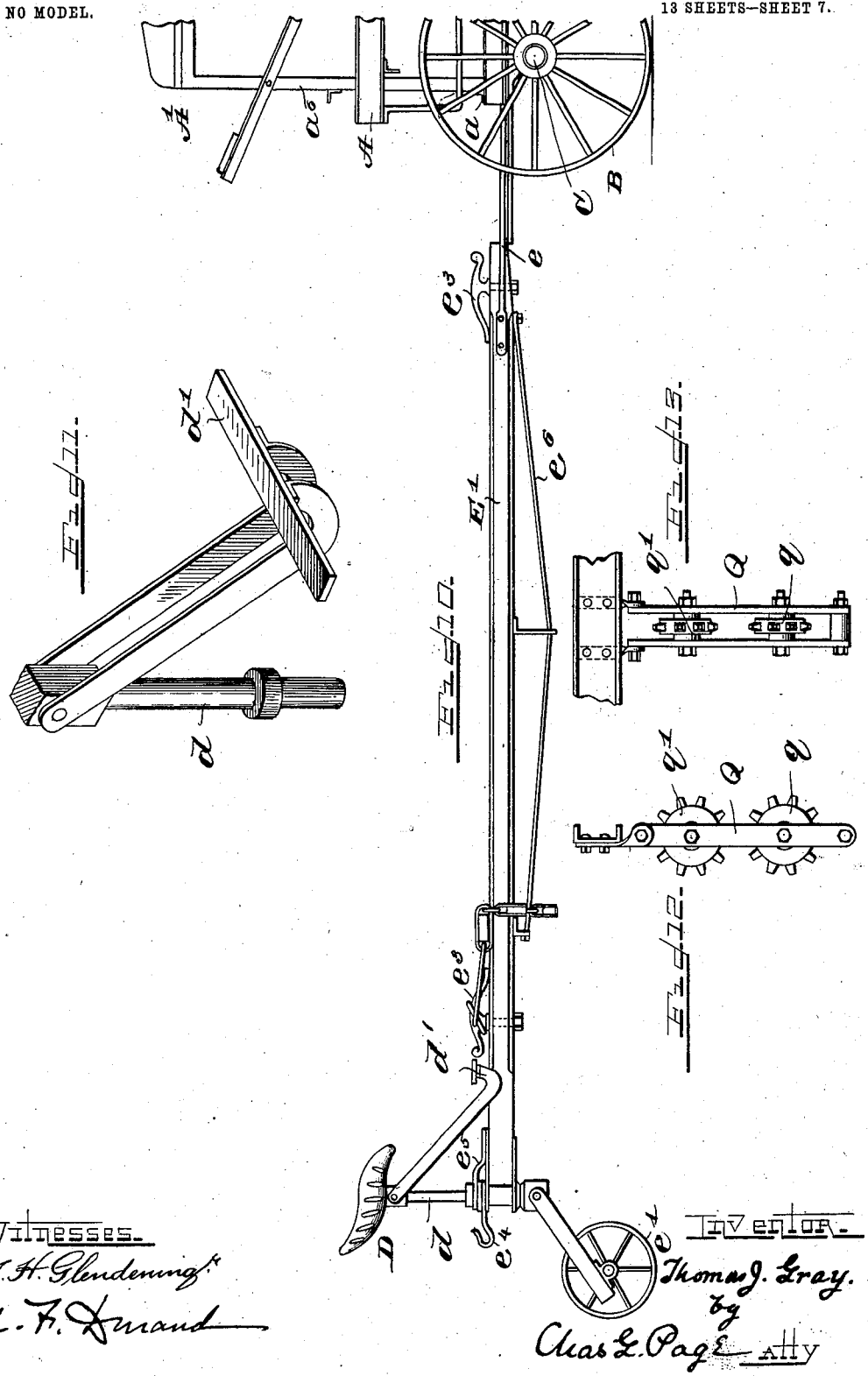

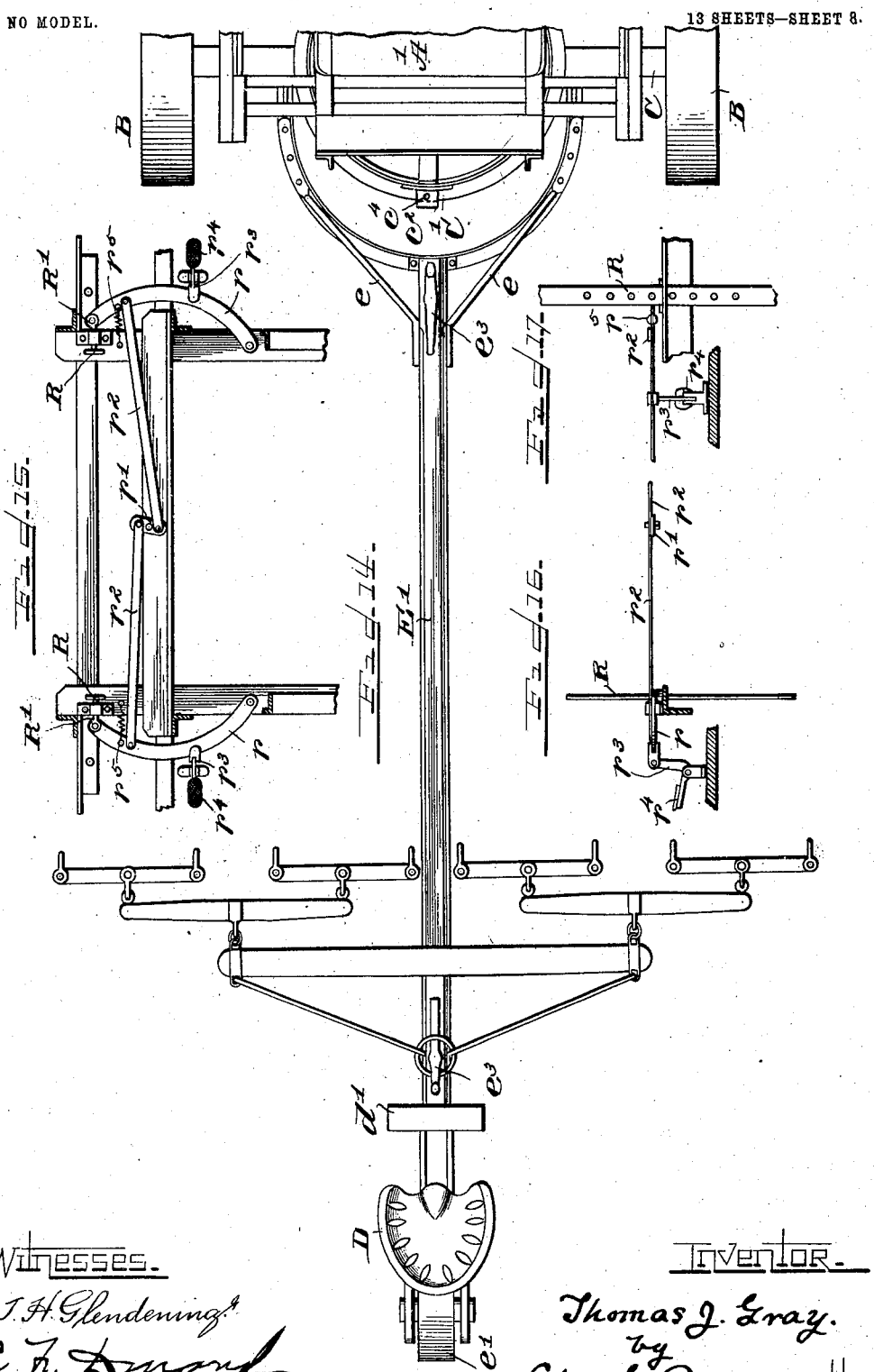

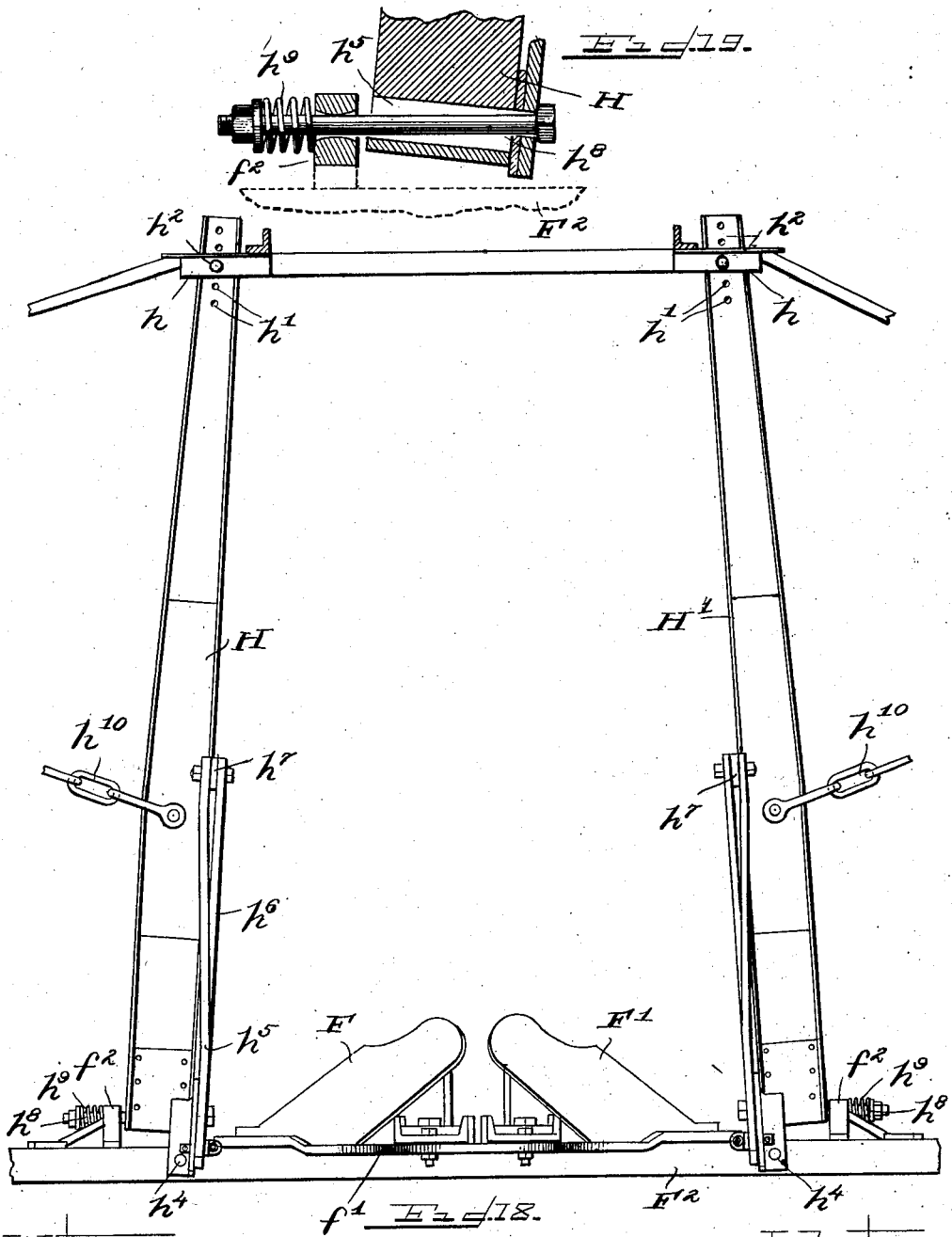

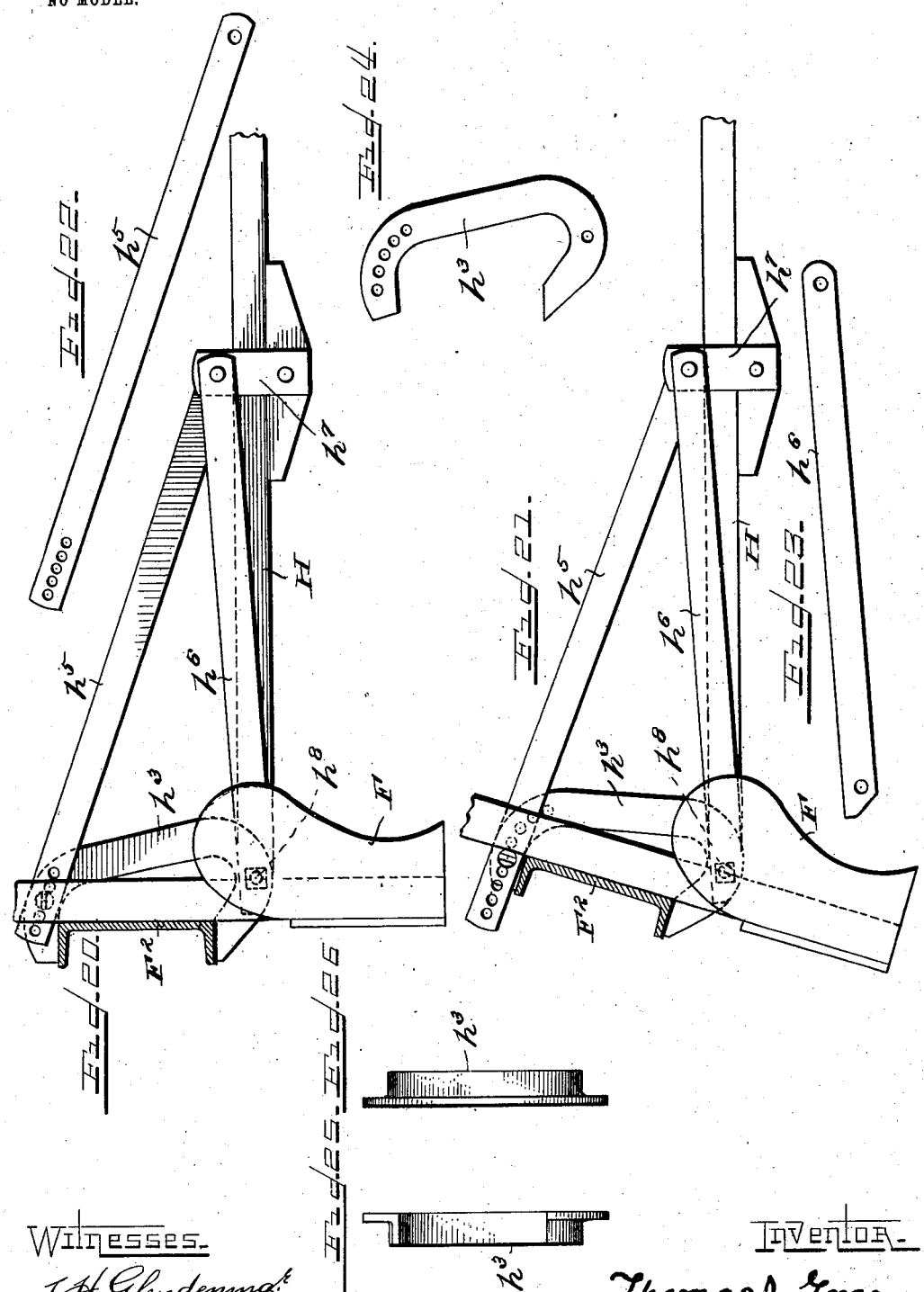

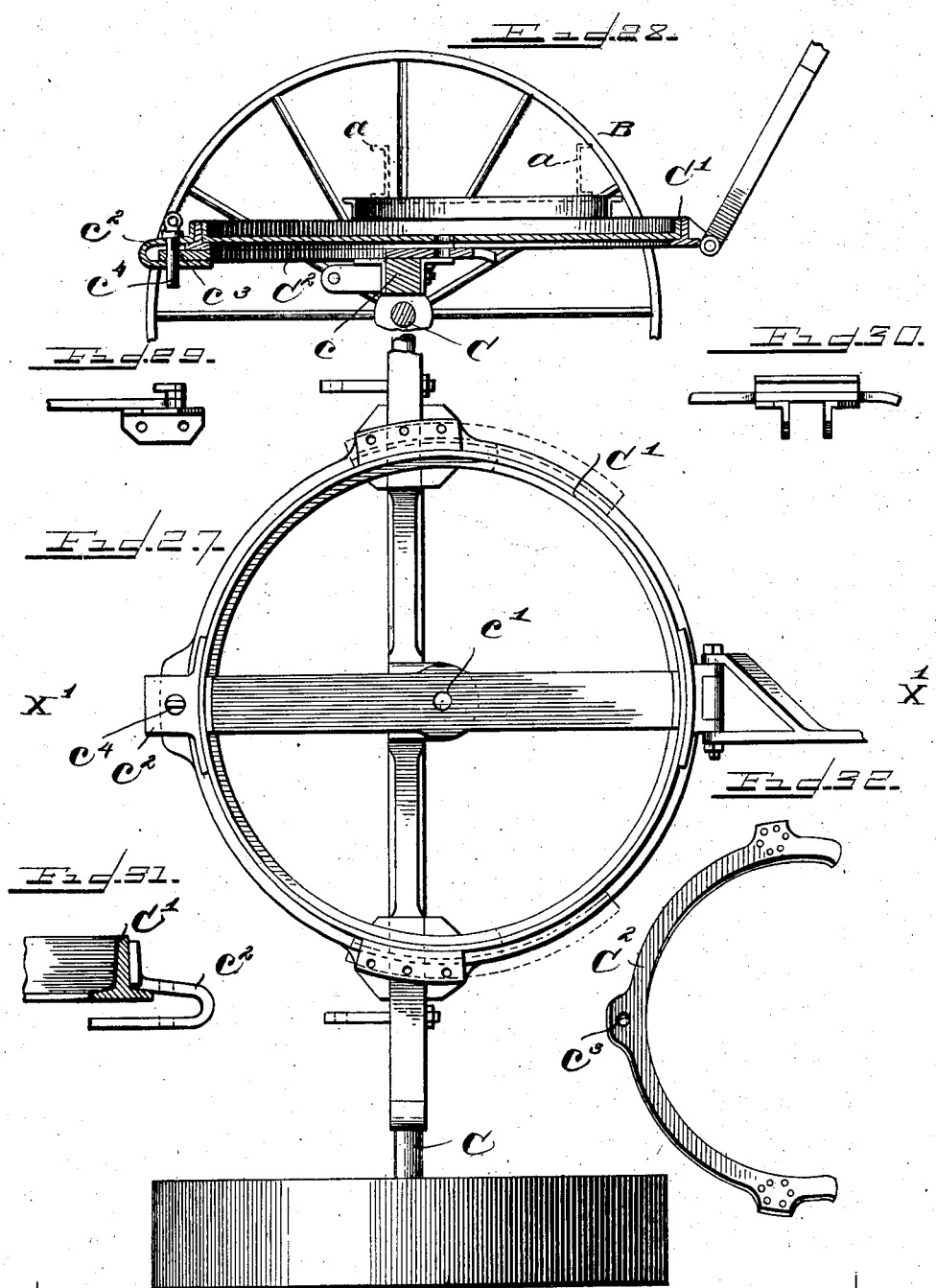

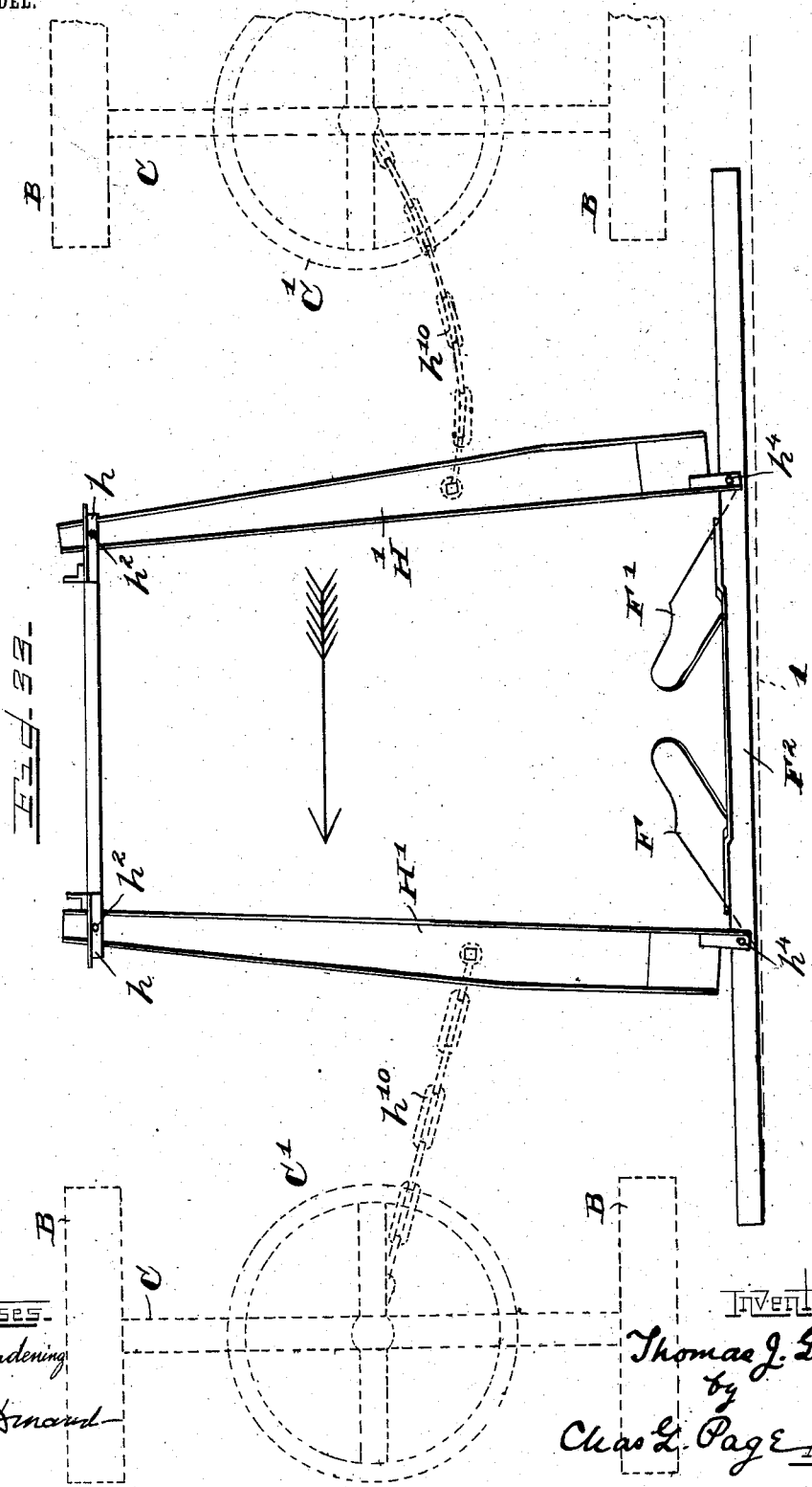

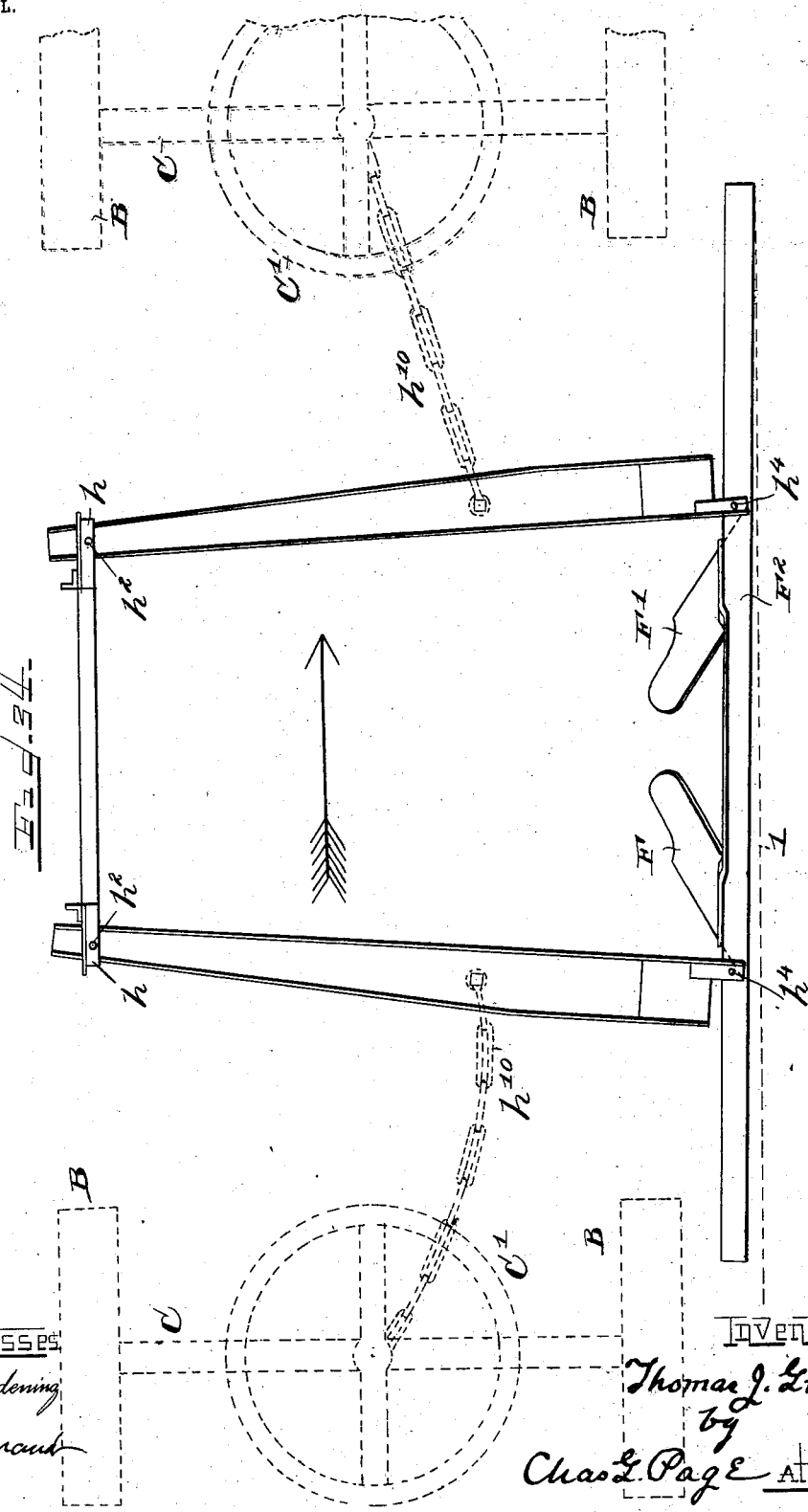

No. 737,224. Patented August 25, 1903.

UNITED STATES PATENT OFFICE.

THOMAS J. GRAY, OF CHICAGO, ILLINOIS, ASSIGNOR TO FREDERICK C. AUSTIN, OF CHICAGO, ILLINOIS.

GRADING AND DITCHING MACHINE.

SPECIFICATION forming part of Letters Patent No. 737,224, dated August 25, 1903.

Application filed August 3, 1901. Serial No. 70,761. (No model.)

*To all whom it may concern:*

Be it known that I, THOMAS J. GRAY, a resident of Chicago, county of Cook, and State of Illinois, have invented a certain new and useful Improvement in Ditching and Grading Machines, of which the following is a specification.

Objects of my invention are to provide certain improvements in grading and ditching machines of the type illustrated in Letters Patent of the United States No. 636,506, granted November 7, 1899, to William J. Edwards and Thomas J. Gray, and particularly to provide various features of improvement in a machine of such type involving furrow-opening devices arranged back to back adjacent to the lower end of the elevating device and means for adjusting the position of the furrow-opening devices when the machine is moved in one direction or the other to bring the active furrow-opening device opposite the elevating device, my improvements in a machine of such character being hereinafter described, and particularly pointed out in the claims.

To the foregoing and other useful ends the body-frame is preferably composed of a pair of parallel side beams or side bars connected at each end by means of transversely-disposed bolster-bars. A pivoted axle and a pair of vehicle-wheels are provided at each end of the machine, and the said transversely-disposed bolster-bars are adapted and arranged to rest upon the two fifth-wheel devices. The plow side of the body-frame is preferably and desirably stiffened and strengthened by means of a couple of upwardly-projecting arches or truss devices and also by means of a centrally-arranged and downwardly-extending truss. The farther or conveyer side of the body-frame is preferably strengthened by means of a centrally-located arch or truss device and also by means of a couple of short arches or truss devices arranged, preferably, near the opposite ends of the body-frame. A pair of uprights are also preferably provided at the conveyer side of the body-frame. These uprights are connected at top and bottom and preferably extend below the side bar of the frame. Uprights are provided at each end of the body-frame and adapted at their upper ends to support the two drivers' seats. With a fifth-wheel at each end of the machine the conveyer is preferably driven by a motor mounted upon the frame or body of the machine. In this way the operation of the conveyer is not dependent upon the forward movement of the machine. The plow-beam is preferably provided with a pair of plows arranged to point in opposite directions. Each plow is adapted and arranged to deliver the soil to the lower end of the conveyer, and the latter then discharges the soil at the farther side of the machine. A pair of swinging beams or draft-bars are arranged to connect the plow-beam with the body-frame. These swinging beams or draft-bars are arranged to converge from their points of connection with the plow-beam to their points of connection with the body-frame, and each beam is preferably connected with the body-frame through the medium of a chain or like flexible connector. With this arrangement the plow-beam is capable of longitudinal or endwise shift, and as it is adjustably suspended from the body-frame it is also capable of bodily up-and-down movement and of being tilted down at either end. When moved endwise, the plow-beam will automatically turn or swing horizontally and assume a position which is at an angle relatively to the line of progress. This automatic swinging adjustment of the plow-beam is caused by the angular arrangement of the two draft-bars. If the machine is running in one direction, the forward draft-chain will allow the beams to swing back and in so doing will cause the forward end of the plow-beam to swing outward and the rear end to swing inward. This will throw the plow which is in use into an operative position with relation to the conveyer and will also throw the plow not in use into a position where it will not drag or in any way interfere with the operation of the machine. Preferably the ends of the plow-beam are provided with sheaves or pulleys, and the hand-wheels for raising and lowering the plow-beam are connected with these sheaves or pulleys by means of chains or like flexible connectors. The arrangement of the hand-wheels and chains is preferably such that the raising and lowering and tilting of the plow-beam can be effected or controlled from either end of the machine. The outer end of the conveyer is preferably supported by chains having their end portions wound upon a hand-wheel shaft mounted upon bearings in the body-frame. These chains are preferably trained over sheaves or pulleys mounted at the outer end of the conveyer-frame, and the opposite ends of the chains are preferably connected with the body-frame. As a simple and effective arrangement for locking the conveyer against upward movement a pair of vertically-disposed bars are provided at each side of the conveyer, their lower ends being pivoted to the conveyer-frame and their upper ends being provided with a series of holes. Oppositely-arranged and horizontally-working locking-bolts are mounted upon the body-frame and arranged to engage the holes in the upper portions of said vertically-disposed bars. These locking-bolts are preferably connected and arranged for simultaneous adjustment. The conveyer-frame is preferably composed of upper and lower sections, and as a simple and effective means for tightening the conveyer-belt the lower section is connected with a ratchet device by means of chains or cables. This said ratchet device is operated by a hand-lever and is adapted to wind up the chains for the purpose of causing the lower section of the conveyer to move or shift toward the plow, and thereby tighten the conveyer-belt.

The machine is preferably provided at each end with a tongue, and each tongue is provided with the usual draft appliances. With respect to the reversibility of the machine each tongue is adapted to serve alternately as a pushing and a pulling tongue. Each tongue is adapted to remain in its place, and only the draft appliances are shifted when the machine is reversed. The end of each tongue is preferably supported by a caster-wheel. In this way each tongue is adapted to operate as a riding-tongue—that is to say, each tongue is adapted to carry the driver of the pushing team—and to such end a suitable seat is provided and constructed so as to be readily adjustable from one tongue to the other. In this way, as previously stated, the tongues remain in place, and with the exception of the said driver's seat only the draft appliances are shifted or readjusted when the machine is reversed.

The construction and operation of my invention, together with other advantages and features of improvement, will, however, hereinafter more fully appear.

In the accompanying drawings, Figure 1 is a side elevation of a reversible grading and ditching machine constructed in accordance with my invention. Fig. 2 is a plan of the machine shown in Fig. 1. Fig. 3 is a transverse section on line X X in Fig. 2. Fig. 4 is a perspective of the vehicle frame or body. Fig. 5 is a plan of the said machine and also of the tongues and draft appliances, the central portion of the machine being broken away for convenience of illustration. Fig. 6 is a side elevation of the devices and portions of the machine shown in Fig. 5. Fig. 7 is a perspective of one of the hooks for connecting the draft appliances with the tongue. Fig. 8 is a perspective of one of the caster-wheel stems and of the hammer-strap and draft-hook applied to said stem. Fig. 9 is a perspective of the tongue-braces. Fig. 10 is an enlarged side elevation of one of the tongues, the tongue in this case serving as a pushing-tongue and having a driver's seat for the driver of the pushing team. Fig. 11 is a perspective of the seat-post and foot-rest, the latter being adapted to engage and straddle the tongue. Fig. 12 is a side elevation of the hanger and sprockets for the driving-belt of the conveyer. Fig. 13 is a front elevation of the device shown in Fig. 12. Fig. 14 is a plan of the parts and devices shown in Fig. 10. Fig. 15 is a plan of the mechanism for operating the bolts or pins which lock the conveyer against upward movement. Figs. 16 and 17 are respectively side and rear elevations of one of the foot treadles and levers for operating said locking-bolts. Fig. 18 is an enlarged plan of the central portion of the plow-beam and of the two angularly-disposed draft-bars for connecting said beam with the farther side of the frame or body, and in this view it will be seen that the said draft-bars converge from their points of connection with the plow-beam to their points of connection with the frame or body. Fig. 19 is a horizontal section through the joint or point of connection of one of the draft-bars with the plow-beam and illustrating the spring or yielding connection which each draft-bar has with said plow-beam. Figs. 20 and 21 are detail elevations illustrating the adjustment by which the plow can be inclined or tilted to one side. Figs. 22 and 23 illustrate, respectively, the upper and lower bars for connecting the plow-beam with the draft-bar. Figs. 24, 25, and 26 are side elevations of one of the U-shaped members employed for connecting the draft-bars with the plow-beam. Fig. 27 is an enlarged plan of one of the fifth-wheel devices. Fig. 28 is a section on line X' X' in Fig. 27. Figs. 29 and 30 are detail views illustrating the form of connection employed for connecting the lower member of the fifth-wheel device with the axle. Fig. 31 is a detail view showing the hook-shaped bracket which is secured to the upper member of the fifth-wheel device and through which the locking-pin is inserted. Fig. 32 is a perspective of the lower member of the fifth-wheel device. Figs. 33 and 34 are diagrammatic views illustrating the operation of the two plows. These two views illustrate the automatic swinging adjustment of the plow-beam, which is caused by the angular positions of the two draft-bars and which causes the plow-beam to swing horizontally and assume an angle to the line of progress. In these two views the dotted line indicates the line of progress, which is of course parallel with the body of the machine. In Fig. 33 the machine is supposed to be moving to the left, and consequently the draft-bars and plow-beam have swung back and in so doing have carried the rear or inoperative plow away from the furrow, the forward end of the plow-beam being farther away from the machine than its rear end, and in Fig. 34 the machine is supposed to be moving to the right, and consequently the position of the draft-bars and plow-beam is the reverse of that shown in Fig. 33. It will be understood that this horizontal and backward and forward shift on the part of the plow-beam and draft-bars is possible by reason of the two draft-chains being of such length that the one not in use is always slack.

As thus illustrated my invention comprises a frame or body composed, as previously explained, of parallel beams or side bars A, which are preferably connected at each end by means of transversely-arranged bolster-bars $a$. It will be observed that the plow side of said frame is preferably provided with a pair of short arches or upwardly-extending truss devices $a'$ $a'$ and also with a downwardly-extending truss $a^2$. The farther or conveyer side of the frame is preferably likewise strengthened or stiffened by means of a long arch or truss $a^3$ and also by means of a pair of short arches or truss devices $a^4$ $a^4$. As a means of properly supporting the conveyer the said body-frame is also provided with a pair of uprights $a^5$ $a^5$, which, it will be observed, are connected at top and bottom and which extend somewhat below the side bar A. The body-frame thus constructed is preferably provided at each end with uprights $a^6$, which are adapted at their upper ends to support the two drivers' seats A' A'. It will also be observed that various braces and beams are provided and arranged to connect and properly strengthen the main portions of the said body-frame. Thus constructed the body-frame is supported upon vehicle-wheels B, mounted upon pivoted and swinging axles C. The bolster-bars $a$ are arranged to rest upon the fifth-wheel devices, which are interposed between the body-frame and the wheel-axles. Each fifth-wheel is preferably composed of upper and lower members C' $C^2$, the former being ring-shaped or angular in form and the latter being curved or segmental in form. (See Figs. 27 and 22.) The said upper member of each fifth-wheel is secured to the bolster-bars A, and the lower member $C^2$ is secured to the axle C, preferably through the medium of the wooden bolster $c$. In each case the two members of the fifth-wheel device are connected by a king-bolt $c'$, which permits turning or relative rotation on the part of the two members, so as to permit the axle to swing or skew in turning around. The upper member of each fifth-wheel device is preferably provided with a bracket $c^2$, provided with openings adapted to register with an opening $c^3$ in the lower member $C^2$ of the fifth-wheel. The pin $c^4$ is adapted to be inserted through said openings and when inserted through the openings both in the said bracket and lower member of the fifth-wheel locks the two members of the fifth-wheel against relative movement. In this way either fifth-wheel can be locked against turning. If the machine is to be driven or propelled in one direction, the pin is then inserted in the rear fifth-wheel, while the forward fifth-wheel is unlocked and allowed to turn. If the machine is to be operated in the opposite direction, then the conditions are reversed, the fifth-wheel which was formerly locked being now unlocked and the fifth-wheel which was formerly free to turn being now locked, so as to render its axle rigid with the body-frame. With this construction the machine is adapted for movement in either direction.

Referring more particularly to Figs. 5, 6, 10, and 14, it will be seen that a tongue is provided at each end of the machine. Each tongue is desirably adapted to serve either as a pushing or a pulling tongue, according to the direction in which the machine is moving. Each tongue is also preferably constructed to carry the driver of the pushing team, and to such end a driver's seat D is provided and adapted for ready adjustment from one tongue to the other. In Figs. 5 and 6 the machine is supposed to be moving to the left, as shown by the arrow, and consequently tongue E is a pulling-tongue, while tongue E' is a pushing-tongue. The two tongues are connected in a suitable manner with the two axles and are preferably braced by means of rods or tongue-braces $e$. The weight of these tongues makes it desirable to provide some means for supporting them, and for such purpose the caster-wheels $e'$ are provided and arranged with their stems extending upwardly through the end portions of said tongues. These caster-wheels, it will be readily understood, adjust themselves with reference to the direction in which the machine is moving and support the tongues in substantially horizontal positions. As stated, the seat D is desirably readily adjustable from one tongue to the other, and to such end the stems $e^2$ of the caster-wheels can be made hollow and adapted to receive the seat-post $d$ of the driver's seat. Said driver's seat is preferably provided with a foot-rest $d'$, and the bars which connect this foot-rest with the seat are preferably adapted and arranged to engage and straddle the tongue. With this arrangement the seat can be readily shifted from one tongue to the other when the machine is reversed and when applied to either tongue will be held firmly and securely in place. Each tongue is preferably provided with a pair of hooks $e^3$, to which the draft appliances are applied. (See Figs. 5, 6, 10, and 14.) It will also be observed that the end of each tongue is provided with a draft-hook $e^4$; it being understood that preferably two teams are employed for the pulling-tongue and one for the pushing-tongue. This will be readily understood by reference to Figs. 5 and 6, in which, as before explained, the machine is supposed to be moving to the right and in which case the two pulling teams are hitched to tongue E, while the pushing team is hitched to tongue E'. These draft-hooks $E^4$ are preferably applied to the stems $e^2$ of the caster-wheels, and with this arrangement it is preferable that the end of each tongue be provided with a hammer-strap $e^5$. Preferably each tongue is stiffened or strengthened by a truss $e^6$, which prevents the tongue from sagging in the middle. With the tongues thus constructed and arranged the teams can be readily shifted so as to reverse the motion of the machine. It will be readily understood that the draft appliances which are applied to the tongues and which are shown in Figs. 5, 6, 10, and 14 can be of any known or approved form or construction.

The body-frame, constructed as previously explained, is adapted to support the excavating and conveying devices, which in this case consist of a pair of plows F and F' and a belt conveyer G. The two plows, it will be observed, are arranged to point in opposite directions and are also arranged in such manner as to be capable of delivering the soil to the lower end of said conveyer. These two oppositely-pointing plows are preferably adjustably secured to the plow-beam $F^2$, the latter being preferably arranged at one side of the machine, as illustrated. Each plow is pivoted at $f$, and its upper portion is adjustably secured to the brace $f'$. It will be understood that the adjustable connection between the upper portions of the plows and the brace $f'$ can be of any suitable form—as, for example, it can consist of a locking-bolt and a series of bolt-holes, such as shown in Fig. 1. With this arrangement each plow can be tilted forward or back about its pivotal point, so as to either depress or elevate its point or toe, it being observed that in Fig. 1 the upper portions of the two plows are thrown apart, so as to depress the point of each plow. With this arrangement the right-hand end of the plow-beam $F^2$ will be tilted up when the plow F is to be employed, and, vice versa, the left-hand end of said beam will be tilted up or elevated when the plow F' is to be employed. In this way either plow is thrown out and away from the furrow when the other plow is to be employed for plowing up the soil and delivering it to the conveyer.

The plow-beam $F^2$, as previously explained, is preferably arranged for a bodily rise and fall or vertical or up-and-down adjustment and also for a tilting adjustment, whereby either end of the plow can be tilted down for the purpose of throwing the plow at that end into the ground. As a simple and effective arrangement for connecting the plow-beam with the body-frame the two swinging beams or draft-bars H and H' are employed and arranged as shown in Figs. 2, 3, and 18. Referring more particularly to Fig. 18, it will be seen that these swinging beams or draft-bars are arranged to converge from their points of connection with the plow-beam to their points of connection with the frame or body. It will also be observed that these draft-bars are preferably arranged at either side of the conveyer G and that their position is substantially horizontal. These swinging beams or draft-bars are preferably provided with a pivotal or swinging connection with the body-frame—as, for example, by adapting their end portions to engage the hooks $h$, which, it will be understood, are secured to and made rigid with the body-frame. In order to provide the plow-beam and two plows with a sidewise or lateral adjustment, the two end portions of the draft-bars can be provided with a series of holes $h'$, adapted to be engaged by the pins $h^2$, which are inserted through the hooks $h$. As a matter of further improvement and as a simple and effective arrangement for connecting the outer ends of the draft-bars with the plow-beam the U-shaped members $h^3$ are provided and arranged to embrace the plow-beam. Each U-shaped member is pivoted to the plow-beam by means of a bolt or rod $h^4$. The outer ends of the draft-bars are provided with openings $h^5$. At a point outside of the end of each draft-bar the plow-beam is provided with a bracket $f^2$. The upper and lower bars $h^5$ and $h^6$ have their outer ends secured to the upper and lower portions of the U-shaped members $H^3$ and have their inner ends pivotally connected with the draft-bars through the medium of the short bars $H^7$. It will be observed that these bars $h^5$ and $h^6$ converge from their points of connection with the U-shaped beam $h^3$ to to their points of connection with the draft-bars. The bolts or rods $h^8$ are arranged to extend through the draft-bars and the brackets $f^2$ and also through the U-shaped members $h^3$ and the lower bars $h^6$. This arrangement of these bolts or rods $h^8$ is shown in Fig. 19. With this arrangement it will be seen that each draft-bar is not only connected with the plow-beam through the medium of the U-shaped member $h^3$ and the bars $h^5$ and $h^6$, but also through the medium of the bolt or rod $h^8$ and the bracket $f^2$. Referring to Fig. 19, it will also be seen that a coil-spring $h^9$ is interposed between the outer side of said bracket and the nut and washer, forming a shoulder on the end of said bolt and rod $h^8$. In each case the bolt or rod $h^4$ forms a pivotal point about which the draft-bars are free to swing, and at this juncture it will be seen that when a draft-bar swings toward the plows it swings away from the bracket $f^2$ and in so doing compresses the spring $h^9$. In this way the said springs and bolts form yielding connections for permitting the draft-bars to swing about their points of pivotal connection with the plow-beam. Each draft-bar is preferably provided with a chain $h^{10}$, the said chains being preferably arranged to connect the draft-bars with the king-bolts or some other portions of the running-gear.

For some purposes it is desirable that the plows have an adjustable connection, permitting them to be inclined or tilted to one side. As a simple and effective arrangement whereby the plows can be thus tilted the upper bars $h^5$ can be provided with adjustable connections with the upper portions of the U-shaped members $h^3$. For example, a series of holes can be provided, as shown in Figs. 20 and 21, whereby the pin or bolt $h^{11}$ can be removed and then inserted at a different point, so as to lock the plow-beam and the two plows in an inclined position. For example, in Fig. 20 the plow-beam and plows are shown in a vertical position, while in Fig. 21 the beam and plows are shown tilted toward the conveyer. It will be understood that when the pin or bolt $h^{11}$ is removed the plow-beam and plows tilt about a longitudinal and horizontal axis afforded by the bolts $h^8$. With this arrangement the plow-beam can be raised and lowered and tilted, and the plows can be tilted to one side, and there is also a further automatic adjustment of the plows and plow-beam, which is due to the angular arrangement of the two draft-bars. This automatic adjustment of the plows and plow-beam will be understood by referring to Figs. 33 and 34, which are diagrammatic views illustrating the positions of the plow-beam and plows when the machine is moving in opposite directions. In Fig. 33 the machine is supposed to be moving to the left, and the slack in the draft-chain to the left has permitted the draft-bars to swing back—that is to say, to swing to the right—and in so doing the draft-bars have caused the plow-beam to stand at an angle to the dotted line 1, which latter indicates the line of progress. This is due to the fact that the farther the beam H swings to the right the farther the left-hand end of the beam will move from the machine, while the farther the draft-bar H' moves to the right the nearer the right-hand end of the plow-beam will come to the machine. In other words, the forward end of the plow-beam is thrown out, while its rear end is thrown in. This will cause plow F to assume an operative position, while plow F' will be thrown back and away from the furrow, so as not to drag or interfere with the operation of plow F. In Fig. 34 the machine is supposed to be reversed and to be now moving to the right. The slack in the draft-chain to the right has permitted the draft-bars, plow-beam, and plows to swing to the left, causing the right-hand end of the plow-beam to move outward and its left-hand end to move inward. In this position the plow-beam stands at an angle which is the opposite or reverse of the angle which it assumed in Fig. 33. In this way it is only necessary to start the machine in either direction to cause the plows to automatically adjust themselves with reference to the direction in which the machine is to operate and to cause the plow to be employed to be brought into operative relation with the conveyer and to cause the other plow to be moved to a position where it will in no way interfere with the operation of the machine. It will be understood, however, that in reversing the machine it is necessary to change the tilt of the plow-beam, so as to throw one plow down and the other up.

Any suitable arrangement or device can be employed for raising and lowering and tilting the plow-beam; but as a matter of further improvement each end of the plow-beam is provided with a sheave or pulley $F^3$, and the frame or body of the machine is provided with a number of like sheaves or pulleys 2, 3, 4, 5, 6, 7, 8, and 9. A pair of hand-wheels I and I' are provided and mounted in suitable bearings on the body-frame at points at either side of the longitudinal center of the machine. These hand-wheels are provided with shafts or drums $i$ and $i'$, which are mounted to rotate about an axis extending lengthwise of the machine. A second pair of hand-wheel shafts J and J' are provided and arranged adjacent to the aforesaid hand-wheels. These hand-wheels J and J' are arranged at either side of the longitudinal center of the machine; but in this case their drums or shafts $j\ j'$ are arranged transversely and at right angles to the axis of the drums or shafts $i\ i'$. The hand-wheels I J, together with their drums or shafts, constitute the second set. These are the hand-wheels and drums or shafts by which the plow is raised and lowered and tilted and which are connected with said plow-beam through the medium of chains K and K'. It will be observed that one end of the chain K is wound upon the hand-wheel shaft or drum $i$, is then brought under the sheave or pulley 4, extends forward and over the sheave or pulley 2, thence downward and under the sheave or pulley $f^3$ on the plow-beam, then extends upward and over the sheave or pulley 3, then back and under the sheave or pulley 5, and, finally, upward and to a point where it has its opposite end wound upon the drum or shaft $j'$. On the other hand, chain K' has one end wound upon the drum or shaft $i'$, extends downward and under the sheave or pulley 8, then forward and over the sheave or pulley 6, is then brought downward and around the sheave or pulley $f^3$ on the plow-beam, is then brought upward and over the sheave or pulley 7, then extends back and under the sheave or pulley 9, and is then brought upward and has its opposite end wound upon the shaft or drum $j$. With this arrangement it will be seen that a simultaneous rotation of wheels I and J will operate to raise or lower the plow-beam bodily, while rotation of either one of these wheels will operate to raise or lower either end of the plow-beam—that is to say, to tilt the latter. It will also be observed that a simultaneous rotation of hand-wheels I' J' will likewise operate to raise or lower the plow-beam bodily and that as in the previous case a rotation of either one of these two wheels alone will operate to raise or lower either end of the blow-beam, so as to tilt the latter. In other words, the plow-beam can be raised and lowered or tilted from either end of the machine, it being understood that if the machine is moving to the left the operator will stand at the right and manipulate the wheels I' J' and that if the machine is moving to the right the operator will stand at the left and control the movements of the plow-beam by manipulating the hand-wheels I J. Thus constructed the machine is readily reversible—that is to say, it can be driven or propelled in either direction—and whether the machine is moving one way or the other the operation of the plow is under the complete control of the operator.

As previously stated, the framework of the conveyer is preferably composed of upper and lower sections connected by sliding bars $g$. It will also be observed that the upper section of the conveyer-frame has a swinging connection with the body-frame through the medium of a swinging fulcrum-bar $g'$. With reference to Fig. 3 it will be readily understood that the bars $g\ g'$ are duplicated at the other side of the conveyer. The lower end of the conveyer is preferably supported from a hand-wheel shaft L through the medium of chains $l$. The middle portion of the conveyer is preferably supported from a like hand-wheel shaft M through the medium of chains $m$. The means for supporting the outer end of the conveyer is a matter of further improvement and consists, preferably, of the hand-wheel shaft N, which is mounted in suitable bearings on the body-frame, and of the chain $n$. The outer end of the conveyer is provided with sheaves or pulleys $n'$. (Shown in dotted lines in Fig. 3.) The said chain $n$ is trained over and around these sheaves or pulleys $n'$, has one end secured to and wound upon the hand-wheel shaft N, and has its opposite end connected with the frame or body of the machine—as, for example, by means of the rod $N^2$. It will be readily understood that this chain $n$ is duplicated at the other side of the conveyer. The sheaves or pulleys $n^3$ are preferably provided and mounted upon the frame or body in position to support the upper strands of the chains $n$. With this arrangement the outer end of the conveyer can be raised and lowered by operating the hand-wheel shaft N. The arrangement of the chain over the sheaves tends to increase the power of the hand-wheel shaft and makes it easy to draw up the outer end of the conveyer. As a means of enabling the operator to tighten the conveyer-belt the lower section of the conveyer-frame is preferably connected with a winding-shaft O through the medium of chains $o$. It will be observed that the trend of these chains is such that when the shaft O is rotated so as to wind them up the lower section of the conveyer-frame will be moved downward toward the plows. This downward shift of the lower section of the conveyer-frame will operate to tighten the conveyer-belt, which latter is preferably arranged upon upper and lower and intermediate carrying-rolls. Preferably the winding-shaft O is provided with a ratchet-wheel $o'$ and also with a hand-lever $o^2$. Said lever is provided with a dog adapted to engage said ratchet-wheel, and there is preferably also a locking-dog $o^3$, which is mounted upon the body-frame and which is employed for locking the winding-shaft in any desired position. With this arrangement a vibratory movement of the lever $o^2$ will operate to rotate the shaft O, and thereby wind up the chains $o$, such winding up of the chains, as previously explained, operating to draw the lower section of the conveyer-frame downward, and thereby tighten the conveyer-belt.

With a fifth-wheel at each end of the machine it is desirable and preferable that independently-operated means be employed for driving the belt-conveyer. In Figs. 1, 2, and 3 a gas-engine or other suitable motor P is shown mounted upon the body-frame and suitably connected with the said conveyer. The power-transmitting connection between said engine and the belt of said conveyer may be of any suitable or desired form, but preferably consists of the sprocket-chains $p$ and $p'$. The sprocket-chain $p$ is arranged upon sprockets mounted upon the engine-shaft and the counter-shaft $p^2$, while sprocket-chain $p'$ is arranged upon sprockets mounted upon said counter-shaft and the shaft for the supporting-roll at the outer end of the conveyer-frame. It will also be observed that a hanger Q is provided and constructed with rolls or sprockets $q$ and $q'$, arranged to engage, respectively, the upper and lower strands of the chain $p'$. The hanger and its sprockets or rolls thus provided and arranged serves to direct and steady the chain and to keep the latter tight. With the conveyer thus driven independently of the movement of the machine the speed of the conveyer-belt can be readily regulated in accordance with the character of the soil and the work, and as a further advantage the belt can be readily cleaned. Should the belt become clogged with mud or dirt, the machine can be stopped and the belt allowed to run until it has thoroughly rid itself of all adhering soil. As stated, a gas-engine is preferably employed for driving the conveyer; but it is obvious that other kinds or forms of motor can be employed for this purpose, and for this reason I do not limit myself to any particular motive power for driving the conveyer.

A further feature of improvement consists in the means employed for locking the conveyer against upward movement. Figs. 2, 3, 15, 16, and 17 illustrate a simple and effective device for this purpose. Referring to Fig. 3, it will be seen that the vertically-disposed bars R have their lower ends pivoted to the conveyer-frame and their upper portions provided with a series of holes. These vertically-disposed bars are arranged one at either side of the conveyer-frame and are also arranged to project upwardly and through openings in the beams or bars of the body-frame. With this arrangement the upper portions of these vertically-disposed bars are in position to have their openings engaged by locking pins or bolts. For example, a pair of locking-bolts R' can be provided and arranged to slide in bearings on the frame, and the ends of these locking bolts or pins can be adapted to engage the holes in said bars R. With this arrangement it will be seen that the bars R can be locked against upward movement by causing the bolts to engage any of the holes in said bars and that when thus locked the latter will prevent the conveyer from rising. It is desirable that these locking-bolts be connected for simultaneous operation or adjustment. This is accomplished by mounting the locking-bolts at the ends of pivoted levers or swinging arms $r$, which swing horizontally. The short intermediate lever $r'$ is pivoted at its center and has its opposite ends connected with the levers $r$ by means of links or rods $r^2$. Each lever $r$ is connected with the upper end of a bell-crank lever $r^3$, these bell-crank levers being pivoted in suitable bearings on the body-frame. Each bell-crank lever is provided, as will be observed, with a treadle or foot-piece $r^4$, and with the arrangement shown the locking-bolts can be simultaneously withdrawn from the holes in the bars R by depressing either one of the said treadles or foot-pieces. The springs $r^5$ connect the levers $r$ with the body-frame and operate to normally maintain the locking-bolts in engagement with the bars R. With this arrangement the conveyer can be unlocked from either end of the machine—that is to say, the operator can stand at either end of the machine, according to the direction in which the machine is operating, and unlock the conveyer preliminary to raising or lowering the latter. Upon releasing the foot-treadle the springs $r^5$ throw the locking-bolts back into engagement with the desired holes or openings in the bars R.

From the foregoing it will now be seen that I provide a ditching and grading machine which can be readily reversed and which can be made to work in either direction with equal efficiency. As ordinarily constructed the grading and ditching machines of this type are capable of operating in but one direction—that is to say, they are not capable of operating in both directions at one side of the cut or along the same furrow. This being the case, it was customary previous to my invention to operate the machine in one direction at one side of the cut and to then cross over and come back on the other side of the cut. In some cases it was necessary to make the return trip without excavating. In the latter case considerable time was lost, and it is for the purpose of overcoming this difficulty and facilitating the work that the herein-described machine is constructed so as to be reversible and so as to be capable of operating in both directions at one side of the cut or back and forth along the same furrow. It will also be observed that the herein-described machine can be drawn either way without the necessity of turning around and without the necessity of shifting or readjusting the tongues. This makes it possible to operate in one direction for any desired distance and to then return and operate in the opposite direction along the same side of the cut or excavation, the plows being quickly and, as previously explained, to a certain extent automatically adjusted for movement in the opposite direction. When it is desired to reverse the machine, all that is necessary is to simply shift or reverse the teams, adjust the plow, and to then shift the driver's seat D from one tongue to the other. This, as previously explained, reverses the conditions in respect to the two tongues, the tongue which was formerly a pulling-tongue now becoming a pushing-tongue and that which was formerly a pushing-tongue now becoming a pulling-tongue.

It is obvious that the various details and features of construction can be changed or modified, if desired, without departing from the spirit of my invention. For this reason I do not limit myself to the precise construction and arrangement shown and described.

What I claim as my invention is—

1. A grading and ditching machine comprising a suitable frame or body provided at each end with a fifth-wheel and mounted upon vehicle-wheels, a plow-beam arranged at one side of said frame or body and provided with plows pointing in opposite directions, and a conveyer arranged to receive the soil from either of said plows, according to the direction in which the machine is moving, substantially as described.

2. A reversible grading and ditching machine comprising a frame or body provided at each end with a fifth-wheel and mounted upon suitable vehicle-wheels, and excavating and conveying devices supported from said frame or body at a point between said fifth-wheels and vehicle-wheels, substantially as described.

3. A reversible excavating-machine comprising a suitable frame or body mounted upon vehicle-wheels and provided at each end with a fifth-wheel device, locking devices whereby either one of said fifth-wheel devices can be locked against turning, and excavating devices suspended from said body-frame at a point between said fifth-wheel device, substantially as described.

4. A reversible ditching and grading machine comprising a wheeled body-frame, a plow-beam arranged at one side of said body-frame and provided with plows pointing in opposite directions, a pair of swinging beams connecting said plow-beam with said body-frame, said beams converging from their points of connection with the plow-beam to their points of connection with the frame or body, and draft devices adapted and arranged to permit endwise movement on the part of said plow-beam, substantially as and for the purpose set forth.

5. A reversible ditching and grading machine comprising a wheeled body-frame, a plow-beam arranged at one side of said body-frame, plows adjustably secured to said plow-beam and arranged to point in opposite directions, a conveyer arranged to receive the soil or dirt from either of said plows, according to the direction in which the machine is running, a pair of beams connecting said plow-beam with said body-frame, said connecting-beams being arranged substantially at right angles to the length of the machine, and the two beams diverging from their points of connection with the frame to their points of connection with the plow-beam, whereby a longitudinal or endwise shift on the part of the plow-beam will cause the latter to stand at an angle to the line of progress, substantially as described.

6. A reversible ditching and grading machine comprising a suitable wheeled body-frame, a plow-beam provided with a pair of plows pointing in opposite directions, said plow-beam having a swinging connection with the body-frame, said connections causing the plow-beam to stand at an angle to the line of progress when shifted longitudinally, and suitable draft connections adapted and arranged to permit endwise or longitudinal shift on the part of said plow-beam, substantially as described.

7. A reversible ditching and grading machine comprising a suitably-wheeled body-frame, a plow-beam arranged at one side of said body-frame, a pair of plows secured to said plow-beam and arranged to point in opposite directions, a transversely-arranged conveyer supported from said body-frame and arranged in position to receive the soil or dirt from either one of said plows, according to the direction in which the machine is moving, a pair of swinging beams arranged at either side of said conveyer and serving as mediums of connection between said plow-beam and the farther side of said body-frame, said beams diverging from their points of connection with the body-frame to their points of connection with said plow-beam, a draft connection between each beam and a suitable portion of the said body-frame, said draft connections being adapted and arranged to permit longitudinal or endwise shift on the part of said plow-beam, so as to cause the latter to automatically adjust itself for the purpose of causing it to stand at an angle to the line of progress and bring either plow into operative relation with said conveyer, substantially as described.

8. A reversible ditching and grading machine comprising a suitable frame or body supported upon vehicle-wheels and provided at each end with a fifth-wheel device, a plow-beam arranged at one side of said body-frame and provided with plows pointing in opposite directions, swinging beams arranged substantially transverse to the length of the machine and serving as mediums of connection between the plow-beam and the said frame or body, said beams converging from their points of connection with the plow-beam to their points of connection with the frame or body, and draft devices connecting said beam with suitable portions of the frame or body, said draft devices being adapted and arranged to permit longitudinal or endwise shifting on the part of said plow-beam, so as to turn the latter at an angle and adjust the plows relatively to the conveyer, substantially as described.

9. A reversible ditching and grading machine comprising a suitable frame or body supported upon vehicle-wheels and provided at each end with a fifth-wheel device, a plow-beam arranged at one side of said frame or body, a transversely-arranged belt conveyer supported from the frame or body and arranged to receive the soil or dirt from said plows, a swinging beam arranged at each side of said conveyer and serving as a medium of connection between the plow-beams and the vehicle frame or body, said beams being pivotally connected both with the plow-beam and the vehicle frame or body and the arrangement of said beams being such that they converge from their points of connection with the plow-beam to their points of connection with the vehicle frame or body, and chains or other flexible draft connections between said beams and the frame or body, said draft connections permitting longitudinal or endwise shift on the part of said plow-beam, substantially as and for the purpose set forth.

10. A reversible ditching and grading machine comprising a suitably-wheeled vehicle or body frame, a plow-beam arranged at one side of said body-frame, a pair of plows secured to said plow-beam and arranged to point in opposite directions, each plow being adjustable to different angles about a horizontal axis extending transversely to the plow-beam, substantially as described.

11. A reversible ditching and grading machine comprising a suitably-wheeled body-frame, a plow-beam supported for up-and-down or vertical adjustment, a pair of plows secured to said plow-beam and arranged to point in opposite directions, each plow being adjustable to different angles about a horizontal and transversely extending axis, substantially as described.

12. A reversible ditching and grading machine comprising a suitably-wheeled vehicle or body frame, a plow-beam supported for vertical adjustment, means for raising and lowering either end of the plow-beam, a pair of plows secured to said plow-beam and arranged to point in opposite directions, said plows being adjustable relatively to the plow-beam and about horizontally and transversely extending axes, and means whereby said plow-beam can be adjusted so as to stand at an angle to the line of progress, substantially as described.

13. A reversible ditching and grading machine comprising a suitably-wheeled vehicle or body frame, a plow-beam arranged at one side of said body-frame and provided with a pair of plows pointing in opposite directions, a pair of beams or draft-bars connecting said plow-beam with said body-frame, each beam or draft-bar having a pivotal connection with the plow-beam, whereby said plow-beam can shift longitudinally or endwise, bolts or rods connecting said beams or draft-bars with brackets on said plow-beam, and coil-springs interposed between said brackets and shoulders on said bolts or rods, substantially as described.

14. A reversible ditching and grading machine comprising a suitably-wheeled vehicle frame or body, a plow-beam arranged at one side of said frame or body and provided with a pair of plows pointing in opposite directions, a pair of swinging beams or draft-bars connecting said plow-beam with said frame or body, each beam or draft-bar being connected with the plow-beam through the medium of a U-shaped member pivoted to said plow-beam, and each U-shaped member having its top and bottom portions connected with the beam or draft-bar by means of a pair of bars which converge to their point of connection with said beam or draft-bar, and each beam or draft-bar being connected with the plow-beam by means of a bolt or rod extending through a bracket on the plow-beam, coil-springs being interposed between said brackets and nuts or washers forming shoulders on said rods or bolts, substantially as described.

15. In a reversible ditching and grading machine, the combination of a suitably-wheeled body-frame, a longitudinally-arranged plow-beam, a pair of plows secured to said plow-beam and arranged to point in opposite directions, a pair of swinging beams or draft-bars arranged to connect said plow-beam with said frame or body, bolts or rods extending through the ends of said swinging beams or draft-bars, coil-springs arranged on said bolts or rods and arranged for compression between shoulders on the latter and brackets or projections on said plow-beam, U-shaped members pivoted to said plow-beam and connected with said swinging beams or draft-bars through the medium of a pair of bars which converge from the top and bottom portions of said U-shaped members to their points of connection with said swinging beams or draft-bars, the said rods or bolts also extending through the lower portions of said U-shaped members and the lower bars connecting the latter with the swinging beams or draft-bars, substantially as described.

16. In a reversible ditching and grading machine, the combination with a suitably-wheeled vehicle or body frame, a plow-beam arranged at one side of said body-frame, a pair of plows secured to said plow-beam and arranged to point in opposite directions, a pair of swinging beams or draft-bars connecting said plow-beam with said frame or body, U-shaped members pivoted to said plow-beam and serving as medium of connection between said draft-bars and said plow-beam, bars pivotally connected with said swinging beams or draft-bars and adjustably connected at their outer ends with the upper portions of said U-shaped members, whereby the plow-beam and the two plows can be tilted or adjusted about a horizontally and longitudinally extending axis, substantially as described.

17. In a reversible ditching and grading machine, the combination of a frame or body supported upon vehicle-wheels and provided at each end with a fifth-wheel device, means whereby either fifth-wheel may be locked against turning, a longitudinally-arranged plow-beam provided with a pair of plows arranged to point in opposite directions, swinging beams or draft-bars connecting the plow-beam with the frame or body, said beams and draft-bars converging from their points of connection with the plow-beam to their points of connection with the said frame or body, draft connections between said swinging beams or draft-bars and the frame or body, said draft connections being adapted or arranged to permit longitudinal or endwise shift on the part of said plow-beam, U-shaped members pivoted to the plow-beam and connecting the latter with said draft-bars, bolts extending through the U-shaped members and slots in the ends of said draft-bars, said bolts also extending through brackets or projections on the plow-beam, coil-springs interposed between said brackets and nuts or washers forming shoulders on the said bolts, and bars pivotally connected at one end with said draft-bars and adjustably connected at their other ends with the upper portions of said U-shaped members, substantially as described.

18. A reversible ditching and grading machine comprising a suitably-wheeled vehicle or body frame, a plow-beam arranged at one side of said body-frame, a pair of plows secured to said plow-beam and arranged to point in opposite directions, swinging beams or draft-bars arranged to connect said plow-beam with said body-frame, U-shaped members pivoted to said plow-beam and having also pivoted connections with said swinging beams or draft-bars, and connecting-bars pivotally connected at their inner ends with said draft-bars and having their outer ends adjustably connected with the upper portion of said U-shaped members, whereby the plow-beam and the two plows can be tilted laterally about the axis afforded by the said pivotal connections between said draft-bars and said U-shaped members, substantially as described.

19. A reversible ditching and grading machine comprising a suitably-wheeled body-frame, a plow-beam arranged at one side of said body-frame, a pair of plows adjustably secured to said plow-beam and arranged to point in opposite directions, means whereby the said plows can be relatively adjusted in such manner as to depress their points, adjusting devices adapted and arranged for bodily raising and lowering the plow-beam, said adjusting devices being also adapted for raising and lowering either end of the plow-beam, so as to tilt the latter and thereby throw the point of one plow into the ground and the point of the other out of the ground, a conveyer arranged to receive the soil from either plow, according to the direction in which the machine is running, means for driving said conveyer, means for causing a longitudinal or endwise shift on the part of said plow-beam, so as to bring either plow into operative relation with said conveyer, substantially as described.

20. A reversible ditching and grading machine comprising a suitably-wheeled body-frame, a plow-beam arranged at one side of said body-frame, a pair of plows secured to said plow-beam and arranged to point in opposite directions, a sheave or pulley mounted at each end of said plow-beam, hand-wheel shafts mounted in suitable bearings on said body-frame, sheaves or pulleys mounted on said body-frame, and a pair of chains or like flexible connectors arranged upon said sheaves or pulleys and having their end portions wound upon said hand-wheel shafts, whereby the plow-beam can be raised and lowered or tilted, substantially as described.

21. A reversible ditching and grading machine comprising a suitably-wheeled body-frame, a plow-beam arranged at one side of said body-frame, a pair of plows secured to said plow-beam and arranged to point in opposite directions, a sheave or pulley mounted at each end of said plow-beam, sheaves or pulleys suitably mounted and arranged upon said body-frame, a pair of longitudinally-arranged hand-wheel shafts, a pair of transversely-arranged hand-wheel shafts, and a pair of chains or like flexible connectors arranged upon said sheaves or pulleys and having their end portions wound upon said hand-wheel shafts, each chain having one end portion wound upon one of said longitudinally-arranged shafts and the other end wound upon one of said transversely-arranged shafts, substantially as described.

22. A reversible ditching and grading machine comprising a suitably-wheeled body-frame, a plow-beam arranged at one side of said body-frame, a pair of plows secured to said plow-beam and arranged to point in opposite directions, a sheave or pulley mounted at each end of said plow-beam, similar sheaves or pulleys suitably mounted and arranged upon said body-frame, a transversely-arranged hand-wheel shaft suitably mounted at each side of the longitudinal center of the machine, a transversely-arranged hand-wheel shaft suitably mounted at each side of said longitudinal center of the machine, each transversely-arranged hand-wheel shaft being arranged adjacent to a longitudinally-arranged hand-wheel shaft, and a pair of chains or like flexible connectors arranged upon said sheaves or pulleys and having their end portions wound upon said hand-wheel shafts, one end portion of each chain being wound upon one of said transversely-arranged hand-wheel shafts and the other being wound upon the adjacent longitudinally-arranged hand-wheel shaft, whereby the raising and lowering and also the tilting of the plow-beam can be controlled from either end of the machine, substantially as described.

23. A reversible ditching and grading machine comprising a suitable frame or body mounted upon vehicle-wheels and provided at each end with a fifth-wheel device, a plow-beam arranged at one side of said body-frame, a pair of plows secured to said plow-beam and arranged to point in opposite directions, a set of hand-wheels for each end of said reversible ditching and grading machine, and chains or like flexible connectors for connecting said hand-wheel shafts with opposite ends of said plow-beam, substantially as described.

24. A reversible ditching and grading machine comprising a suitably-wheeled body-frame, a transversely-arranged belt conveyer, a plow arranged to deliver the soil to the lower end of said belt conveyer, a pair of vertically-disposed bars having their lower ends pivotally connected with the frame of said conveyer, locking-bolts carried at the ends of swinging levers and adapted to engage holes in the upper portions of said vertically-disposed bars, links arranged to connect said swinging levers and bell-crank levers provided with foot-pieces and connected and arranged for actuating or moving said pivoted levers, so as to simultaneously operate the two locking-bolts, substantially as described.

25. A reversible ditching and grading machine comprising a suitably-wheeled body-frame, a longitudinally-arranged plow-beam provided with a pair of plows pointing in opposite directions, a transversely-arranged belt conveyer arranged to receive the soil from said plows, a pair of vertically-disposed bars having their lower ends pivoted to the framework of said conveyer, a pair of locking-bolts adapted and arranged to engage holes in the upper portions of said vertically-disposed bars, a pair of pivoted levers for inserting and withdrawing said locking-bolts, a pair of links and a pivoted lever adapted and arranged to connect said pivoted levers for operating the bolts, a pair of bell-crank levers suitable mounted and provided with foot-pieces and connected with the levers which carry the locking-bolts, and springs adapted and arranged for holding the locking-bolts normally in positions to lock the said vertically-disposed bars against vertical movement, substantially as described.

26. A reversible ditching and grading machine comprising a suitably-wheeled body-frame, a plow-beam arranged at one side of said body-frame and provided with a pair of plows pointing in opposite directions, a transversely-arranged belt conveyer arranged to receive the soil from either one of said plows, according to the direction in which the machine is running, a pair of vertically-disposed bars having their lower ends pivoted to the opposite sides of the frame of said conveyer, a pair of horizontally adjustable or movable locking-bolts adapted and arranged to engage holes in the upper portions of said vertically-disposed bars, a pair of horizontally-swinging levers having their free ends pivotally connected with said locking-bolts, springs connecting said levers with the said body-frame, so as to hold the locking-bolts normally in position to lock the said vertically-disposed bars against upward shift or movement, a bell-crank suitably mounted and pivotally connected with each horizontally-swinging lever, each bell-crank being provided with a suitable treadle or foot-piece, a lever pivoted at its center and arranged between said horizontally-swinging levers, and a pair of links for connecting the opposite ends of said centrally-pivoted lever with the said horizontally-swinging levers which actuate or move the locking-bolts, substantially as described.

27. A ditching and grading machine comprising a suitably-wheeled body-frame, a belt conveyer having its frame made in two sections, a plow arranged to deliver the soil to the lower end of said conveyer, means for raising and lowering said conveyer, a ratchet-wheel mounted upon a shaft mounted in bearings on said body-frame, a lever provided with a dog adapted to engage said ratchet-wheel, a locking-dog pivoted to said body-frame and adapted to engage said ratchet-wheel, and a chain arranged to connect the ratchet-wheel shaft with the lower section of said conveyer, whereby the said lever can be employed for rotating said ratchet-wheel shaft for the purpose of winding up said chain and thereby shifting the lower section of said conveyer-frame toward the plow, such movement on the part of the said lower conveyer-frame section operating to tighten the conveyer-belt, substantially as described.

28. A reversible ditching and grading machine comprising a suitable frame or body mounted upon vehicle-wheels and provided at each end with a fifth-wheel device, a plow-beam arranged at one side of said body-frame and provided with plows pointing in opposite directions, a conveyer or elevator arranged to receive the soil from either of said plows, according to the direction in which the machine is running, means for locking either of said fifth-wheels against turning, and a motor mounted upon said body-frame, and having power-transmitting connection with said conveyer, whereby the latter can be operated independently of the forward movement of the said reversible ditching and grading machine, substantially as described.

29. A reversible ditching and grading machine comprising a frame or body supported upon vehicle-wheels and provided at each end with a fifth-wheel device, means whereby either fifth-wheel can be locked against turning, a plow-beam arranged at one side of said body-frame and provided with a pair of plows pointing in opposite directions, a belt conveyer projecting laterally from the said ditching and grading machine and having its lower end arranged to receive the soil from either of said plows, according to the direction in which the machine is running, an engine mounted upon said body-frame, and sprocket-chains and sprocket-wheels arranged as power-transmitting connection between said engine and said belt conveyer, substantially as described.

30. A reversible ditching and grading machine comprising a suitable frame or body supported upon vehicle-wheels and provided at each end with a fifth-wheel device, means whereby either of said fifth-wheel devices may be locked against turning, a plow-beam arranged at one side of said body-frame and provided with a pair of plows pointing in opposite directions, a transversely-disposed belt conveyer having its lower end disposed to receive the soil from the said plows, an engine mounted upon said body-frame, a shaft mounted in bearings below said engine, a sprocket-chain connecting the engine with said shaft, and a sprocket-chain connecting said shaft with the said conveyer, whereby the latter can be driven independently of the forward movement of the machine, substantially as described.

31. A reversible ditching and grading machine comprising a suitably-wheeled body-frame, a plow-beam arranged at one side of said body-frame and provided with a pair of plows, one plow being adapted for operating in one direction and one plow being adapted for operating in the opposite direction, and a pair of swinging draft-bars connecting the said plow-beam with said body-frame, said draft-bars converging from their points of connection with the plow-beam to their points of connection with the body-frame, and suitable draft devices arranged to permit longitudinal or endwise movement on the part of said plow-beam, substantially as described.

32. A reversible ditching and grading machine comprising a body-frame having its side portions formed by a pair of parallel bars suitably connected at each end by bolster-bars, one side of said frame being provided with uprights connected at top and bottom and extending below said parallel side bars, and each end of said frame being provided with uprights adapted to support a driver's seat, substantially as described.

33. A reversible ditching and grading machine comprising a frame or body composed of a pair of parallel side bars, said bars being connected at each end by transversely-extending bolster-bars, one side of said frame being provided with a strengthening-arch and also with a pair of uprights connected at top and bottom and extending below said parallel side bars, and the opposite side of said frame being strengthened by a truss, substantially as described.

34. A reversible ditching and grading machine comprising a frame or body composed of a pair of parallel side bars connected at each end by means of transversely-arranged bolster-bars; one side of said frame being constructed in three strengthening-arches or truss devices, and provided with a pair of uprights connected at top and bottom and extending below said parallel side bars, and the opposite side of said frame being provided with a pair of upwardly-extending short arches or truss devices and with a centrally-arranged and downwardly-extending strengthening-truss, substantially as described.

35. A reversible excavating-machine comprising a suitable frame or body supported upon vehicle-wheels, and provided at each end with a fifth-wheel device, an excavating or digging device arranged at one side of said body-frame and adapted for operation in either direction, a transversely-disposed belt conveyer, having its lower end arranged to receive the soil from said excavating or digging device, a pair of swinging beams or draft-bars arranged to connect the said plow-beam with said body-frame, said draft-bars diverging from their points of connection with the body-frame to their points of connection with the said digging device, draft devices for said excavating or digging device, said draft devices permitting a longitudinal shift or adjustment on the part of said excavating device, hand-wheels and connecting-chains for raising and lowering and tilting the said excavating or digging device, and a motor mounted upon said body-frame and having power-transmitting connection with said conveyer, whereby the latter can be operated independently of the movement of the machine, substantially as described.

36. A reversible ditching and grading machine comprising a suitable frame or body supported upon vehicle-wheels and provided at each end with a fifth-wheel device, a plow-beam provided with plows arranged to operate in either direction, a conveyer arranged to receive the soil from said plow and means for operating said conveyer, each fifth-wheel device being composed of upper and lower members connected and arranged for relative rotation or adjustment, and a locking-pin adapted and applied for locking either fifth-wheel device against turning, substantially as described.

37. A reversible ditching and grading machine comprising a suitable frame or body, a fifth-wheel device arranged at each end of said body-frame, vehicle-wheels and a swinging axle for each fifth-wheel device, a plowing device capable of operating in either direction, a conveyer or elevator arranged to receive the soil from said plowing device, each fifth-wheel being composed of an upper ring or annular member secured to the body-frame and of a lower curved or segmental member secured to the pivoted or swinging axle, and a locking-pin for locking the members of either fifth-wheel against relative rotation, substantially as described.

38. In a reversible ditching and grading machine, a body-frame provided at each end with a fifth-wheel device, each fifth-wheel device being composed of an upper ring or annular member secured to the body-frame and of a lower curved or segmental member secured to the pivoted or swinging axle, a bracket secured to the upper member of each fifth-wheel device and formed to extend down and under the lower member of the fifth-wheel device, each of said brackets being provided with openings adapted to register with an opening in the lower segmental member of each fifth-wheel device, and a locking bolt or pin adapted to be inserted through registering openings of either fifth-wheel, so as to lock the upper and lower members of either fifth-wheel against rotation, substantially as described.

39. A reversible ditching and grading machine comprising a suitably-wheeled body-frame, a plow-beam arranged at one side of said body-frame and provided with plows for operating in either direction, a conveyer adapted and arranged to receive the soil from said plows, a tongue arranged at each end of said machine, each tongue being provided at its end with a caster-wheel, substantially as described.

40. A reversible ditching and grading machine comprising a wheeled body-frame provided at each end with a fifth-wheel device, means for locking either fifth-wheel against turning, a tongue arranged at each end of said machine, each tongue being provided with a caster-wheel, a reversible plow arranged at one side of said body-frame, and a conveyer arranged to receive the soil from said plow, substantially as described.

41. A reversible ditching and grading machine comprising a suitably-wheeled body-frame, a reversible plowing device arranged at one side of said body-frame, a conveyer arranged to receive the soil from said plowing device, tongues arranged at either end of said machine and provided with caster-wheels, each tongue being adapted to serve alternately as a pushing and pulling tongue, according to the direction in which the machine is running, and suitable draft appliances for said tongues, substantially as described.

42. A reversible ditching and grading machine comprising a suitably-wheeled body-frame adapted for movement in either direction, a reversible plowing device arranged at one side of said body-frame, a conveyer arranged to receive the soil from said plowing device, tongues arranged at either end of said body-frame and provided at their ends with caster-wheels, each tongue being adapted to serve alternately as a pushing and pulling tongue, and a driver's seat adapted for adjustment from one tongue to the other, substantially as described.

43. A reversible ditching and grading machine comprising a suitably-wheeled body-frame adapted for movement in either direction, a plowing device adapted for operation in either direction, a conveyer adapted and arranged for receiving the soil from said plowing device, a fifth-wheel arranged at either end of said body-frame, means whereby either fifth-wheel may be locked against turning, tongues arranged at either end of said body-frame, said tongues being provided with supporting-wheels, and a driver's seat adapted for adjustment from one tongue to the other, according to the direction in which the machine is moving, each tongue being adapted to serve alternately as a pushing and a pulling tongue, substantially as described.

44. A reversible ditching and grading machine comprising a suitably-wheeled body-frame adapted for movement in either direction, excavating and conveying means supported from said body-frame, a tongue arranged at each end of said body-frame, a caster-wheel adapted and arranged for supporting the end of each tongue, draft appliances for said tongues, and a driver's seat adapted for adjustment from the stem of one caster-wheel to that of the other, substantially as described.

45. A reversible ditching and grading machine comprising a wheeled body-frame adapted for movement in either direction, excavating and conveying devices supported from said body-frame, tongues arranged at either end of said body-frame, each tongue being adapted to serve alternately as a pushing and a pulling tongue, caster-wheels adapted and applied for supporting the ends of said tongues, draft appliances for said tongues, and a driver's seat adapted for adjustment from one tongue to the other, said driver's seat being provided with a foot-piece adapted to straddle the tongue, substantially as described.

46. A reversible ditching and grading machine comprising a wheeled body-frame adapted for movement in either direction, excavating and conveying devices supported from said body-frame, a tongue arranged at either end of said body-frame, each tongue being adapted to serve alternately as a pushing and a pulling tongue, a strengthening-truss arranged on the under side of each tongue, draft appliances for said tongues, caster-wheels adapted and applied for supporting the ends of said tongues, substantially as described.

47. A reversible ditching and grading machine comprising a wheeled body-frame adapted for movement in either direction, excavating and conveying devices supported from said body-frame, a tongue arranged at either end of said body-frame, a caster-wheel adapted and arranged for supporting the end of each tongue, a hammer-strap and draft-hook applied to the stem of each caster-wheel, suitable draft appliances for each tongue, and a driver's seat adapted for adjustment from the stem of one caster-wheel to that of the other, substantially as described.

48. A reversible ditching and grading machine comprising a suitably-wheeled body-frame adapted for movement in either direction and excavating and conveying devices supported from said body-frame, a tongue arranged at either end of said body-frame, caster-wheels supporting the ends of said tongues, and a hammer-strap and draft-hook applied to the stem of each caster-wheel, substantially as described.

THOMAS J. GRAY.

Witnesses:
M. L. PURVIN,
H. ULRICI.